US006093749A

United States Patent [19]
Watanabe et al.

[11] Patent Number: 6,093,749
[45] Date of Patent: Jul. 25, 2000

[54] ANHYDROUS ZINC ANTIMONATE SOL AND METHOD FOR PRODUCING THE SAME

[75] Inventors: Yoshitane Watanabe; Osamu Tanegashima, both of Funabashi, Japan

[73] Assignee: Nissan Chemical Industries, Ltd., Tokyo, Japan

[21] Appl. No.: 09/168,943

[22] Filed: Oct. 9, 1998

[30] Foreign Application Priority Data

Oct. 16, 1997 [JP] Japan .................................. 9-283664

[51] Int. Cl.[7] .............................. B01F 17/00; C09D 1/00; C04B 14/00; B05D 7/00
[52] U.S. Cl. ........................... 516/36; 516/100; 516/101; 106/286.2; 106/429; 427/219; 427/220
[58] Field of Search ............................ 516/36, 100, 101; 106/286.2, 429; 427/219, 220

[56] References Cited

U.S. PATENT DOCUMENTS

| | | | |
|---|---|---|---|
| 1,211,564 | 1/1917 | Eyer | 252/313.1 |
| 2,329,161 | 9/1943 | Harbert et al. | 23/53 |
| 3,657,179 | 4/1972 | Yates | 260/30.8 |
| 3,676,362 | 7/1972 | Yates | 252/309 |
| 3,860,523 | 1/1975 | Petrow et al. | 252/8.1 |
| 4,110,247 | 8/1978 | Gower, II et al. | |
| 4,169,104 | 9/1979 | Burt | 260/438.1 |
| 4,362,658 | 12/1982 | Contin | 252/609 |
| 4,394,469 | 7/1983 | Stratta et al. | |
| 4,608,198 | 8/1986 | Wanatabe et al. | 252/609 |
| 4,731,198 | 3/1988 | Wanatabe et al. | 252/313.1 |
| 4,770,813 | 9/1988 | Wanatabe et al. | 252/309 |
| 5,091,457 | 2/1992 | Efner | 524/394 |
| 5,190,700 | 3/1993 | Wanatabe et al. | 252/609 |
| 5,368,995 | 11/1994 | Christian et al. | 430/530 |
| 5,457,013 | 10/1995 | Christian et al. | 430/496 |
| 5,707,552 | 1/1998 | Wanatabe et al. | 252/309 |
| 5,766,512 | 6/1998 | Wanatabe et al. | 252/309 |
| 5,785,892 | 7/1998 | Nishida et al. | |
| 5,827,630 | 10/1998 | Eichorst et al. | 430/63 |
| 5,866,287 | 2/1999 | Christian et al. | 430/63 |
| 5,906,679 | 5/1999 | Wanatabe et al. | 106/286.6 |

FOREIGN PATENT DOCUMENTS

| | | |
|---|---|---|
| 0 878 528 A1 | 11/1998 | European Pat. Off. |
| 52-21298 | 2/1977 | Japan. |
| B2-57-11848 | 3/1982 | Japan. |
| 60-41536 | 3/1985 | Japan. |
| 61-3292 | 1/1986 | Japan. |
| 62-125849 | 6/1987 | Japan. |
| 62-182116 | 8/1987 | Japan. |
| WO 92/19540 | 11/1992 | Japan. |
| 6-219743 | 8/1994 | Japan. |
| 9-169952 | 6/1997 | Japan. |
| WO 97/28227 | 8/1997 | Japan. |
| 9-227834 | 9/1997 | Japan. |
| 9728212 | 8/1997 | WIPO. |

OTHER PUBLICATIONS

*Powder Diffraction File: Sets 11–15 (Revised)*, Inorganic vol. No. PD1S–15iRb, Joint Committee on Powder Diffraction Standards, No. 11–214, date unknown.

*X–Ray Powder Data File: Sets 11–5 (Revised)*, ASTM Special Technical Publication 48–J, Joint Committee on Chemical Analysis by Powder Diffraction Standards, et al., No. 3–0455, date unknown.

*Primary Examiner*—Jill Warden
*Assistant Examiner*—Monique T. Cole
*Attorney, Agent, or Firm*—Oliff & Berridge, PLC

[57] ABSTRACT

An anhydrous zinc antimonate sol comprising a surface-modified anhydrous zinc antimonate colloid particles dispersed in a liquid, the surface-modified anhydrous zinc antimonate colloid particles comprising anhydrous zinc antimonate colloid particles as nuclei and a silicon-containing substance coating surfaces of the colloid particles, the sol containing an amine and/or an hydroxycarboxylic acid and a method for producing the same. The anhydrous zinc antimonate sol of the present invention is useful as transparent antistatic materials for resins, plastics, glasses, paper, and magnetic tapes, etc., transparent ultraviolet absorbents, transparent heat wave absorbents, high refractive index hard coating agents, antireflective agents, and the like.

6 Claims, No Drawings

ANHYDROUS ZINC ANTIMONATE SOL AND METHOD FOR PRODUCING THE SAME

BACKGROUND OF THE INVENTION

1. Field of the Invention

The present invention relates to anhydrous zinc antimonate colloid particles sol coated with a silicon-containing substance and a method for producing the same by adding a silicon-containing substance such as a silane coupling agent, a silylating agent or the like to an aqueous or organic solvent sol of anhydrous zinc antimonate. The anhydrous zinc antimonate sol of the present invention finds application in various fields such as transparent antistatic materials, e.g., resins, plastics, glasses, paper, and magnetic tapes, transparent ultraviolet absorbents, transparent heat ray absorbents, high refractive index hard coating agents, antireflective agents, and the like.

2. Description of Related Art

Japanese Patent Application Laid-open No. 219743/1994 discloses aqueous or organic solvent sols of anhydrous zinc antimonate. The disclosed sols include those aqueous or organic solvent sols of anhydrous zinc antimonate which are stabilized with alkylamines such as ethylamine, propylamine, isopropylamine, and diisobutylamine, alkanolamines such as triethanolamine and monoethanolamine, diamines such as ethylenediamine, hydroxycarboxylic acids such as lactic acid, tartaric acid, malic acid, and citric acid. The organic solvents are alcohols such as methyl alcohol, ethyl alcohol, propyl alcohol, and butyl alcohol, glycols such as ethylene glycol and diethylene glycol, cellosolves such as ethylcellosolve and propylcellosolve, amides such as dimethylformamide and dimethylacetamide, and the like.

The organic solvent sols of anhydrous zinc antimonate are used as a transparent antistatic paint, for example, making the best of the characteristics of fine particles. In this case, organic solvent sol of anhydrous zinc antimonate and various resins are mixed to form paints. In order for the mixture to exhibit satisfactory performance as a transparent antistatic paint, the particles of anhydrous zinc antimonate sol must be dispersed in a state close to primary particles without causing their agglomeration. As a solvent for the resins used for this purpose includes hydrophobic solvents such as toluene and xylene, high boiling alcohols such as isopropyl alcohol and butyl alcohol, and the like. Low boiling solvents such as methanol, if present in paints, could cause whitening of coating films due to flushing, so that it is usually preferred that methanol is substituted by one of the above described organic solvent before use. For this reason, the organic solvent sol of anhydrous zinc antimonate for use as a transparent antistatic paint after being mixed with various resins uses hydrophobic solvents such as toluene and xylene or high boiling alcohols such as isopropyl alcohol and butyl alcohol.

However, the anhydrous zinc antimonate organic solvent sols disclosed in Japanese Patent Application Laid-open No. 219743/1994, which are stabilized by addition of alkylamines, alkanolamines, diamines and hydroxycarboxylic acids, exhibit insufficient sol dispersibilities when a high boiling alcohol such as isopropyl alcohol is used as the solvent, so that they have insufficient transparency for use as a transparent antistatic paint.

SUMMARY OF THE INVENTION

Accordingly, an object of the present invention is to provide an anhydrous zinc antimonate organic solvent sol in which anhydrous zinc antimonate particles are dispersed in a state close to primary particles without causing their agglomeration in an organic solvent such as hydrophobic solvents such as toluene and xylene or high boiling alcohols, such as isopropyl alcohol and butyl alcohol and a method for producing the same.

The present invention relates to an anhydrous zinc antimonate sol comprising a surface-modified anhydrous zinc antimonate colloid particles dispersed in a liquid, said surface-modified anhydrous zinc antimonate colloid particles comprising anhydrous zinc antimonate colloid particles as nuclei and a silicon-containing substance coating surfaces of the colloid particles, said sol containing an amine and/or an hydroxycarboxylic acid.

Further, a first method for producing the surface-modified anhydrous zinc antimonate organosol of the present invention comprises the steps of:

(a) mixing an aqueous sol of anhydrous zinc antimonate with a silicon-containing substance followed by stirring, and (b) substituting an aqueous solvent in the aqueous sol obtained in the step (a) by an organic solvent in the presence of an amine and/or an hydroxycarboxylic acid.

Also, a second method for producing the surface-modified anhydrous zinc antimonate organosol of the present invention comprises the steps of: (a') mixing a methanol sol of anhydrous zinc antimonate, a silicon-containing substance, and water, followed by stirring, and (b') substituting a methanol solvent in the methanol sol obtained in the step (a') by a hydrocarbon solvent or an alcohol solvent having 2 to 10 carbon atoms in the presence of an amine and/or an hydroxycarboxylic acid.

As described above, the present invention provides sols comprising a liquid having dispersed therein surfacemodified anhydrous zinc antimonate colloid particles obtained by coating the surfaces of anhydrous zinc antimonate colloid particles as nuclei with a silicon-containing substance (silane-coupling agents, silylating agents, ethylsilicate, methyl silicate, or hydrolysates thereof). The stability of the sols can be increased further by the use of alkylamines such as ethylamine, propylamine, isopropylamine, diisopropylamine and diisobutylamine, alkanolamines such as triethanolamine and monoethanolamine, diamines such as ethylenediamine, hydroxycarboxylic acids such as lactic acid, tartaric acid, malic acid, and citric acid in combination. As a result, stable organosols can be obtained in which colloid particles are dispersed in dispersion medium, e.g., aromatic hydrocarbon based solvents such as toluene and xylene and high boiling alcohols based solvents such as isopropyl alcohol and butyl alcohol in a state close to primary particles.

The organosols of anhydrous zinc antimonate of the present invention have high transparency and, hence, find various applications such as a transparent antistatic material due to conductivity of zinc antimonate, and a transparent ultraviolet absorbent, a transparent heat wave absorbent, high refractive index hard coating agent, an antireflective agent and the like due to ultraviolet rays absorbing power of infrared rays absobing power of anhydrous zinc antimonate when used along with a part-hydrolyzed liquid of silane coupling agent, hydrolyzed liquid of ethylsilicate or methylsilicate or mixed with a resin emulsion.

DESCRIPTION OF PREFERRED EMBODIMENTS

The anhydrous zinc antimonate used as nuclei in the present invention may be one obtained by a conventional method. For example, the anhydrous zinc antimonates described in Japanese Patent Application Laid-open No. 219743/1994 can be used preferably. They are anhydrous zinc antimonates having a $ZnO/Sb_2O_5$ molar ratio of 0.8 to 1.2 and a primary particle diameter of 5 to 500 nm, preferably 5 to 50 nm. The anhydrous zinc antimonates can be produced by mixing a zinc compound and colloidal antimony oxide in a $ZnO/Sb_2O_5$ molar ratio of 0.8 to 1.2 and then calcining the mixture at 500 to 1,100° C. as described in Japanese Patent Application Laid-open No. 219743/1994. In the above-described production method for producing anhydrous zinc antimonate as nuclei, if the colloidal antimony oxide is an antimony oxide sol, then the antimony oxide sol and the zinc compound are mixed and dried, followed by calcinating the dry mixture at 500 to 1,100° C. to produce anhydrous zinc antimonate.

The zinc compound described above is at least one zinc compound selected from the group consisting of zinc hydroxide, zinc oxide, inorganic acid salts of zinc and organic acid salts of zinc. Examples of the inorganic acid salts of zinc include zinc carbonate, basic zinc carbonate, zinc nitrate, zinc chloride, zinc sulfate and the like. On the other hand, the organic acid salts of zinc include zinc formate, zinc acetate, zinc oxalate and the like. As the zinc compounds, those which are commercially available as an industrial chemical may be used. If zinc hydroxide and zinc oxide are used, there can be used those which have a primary particle diameter of 500 nm or less. In particular, those salts containing an acid moiety which evaporates by the calcination, i.e., carbonates and organic acid salts, are preferred. These can be used alone or in admixture of several kinds.

The above-described colloidal antimony oxide is antimony oxide which has a primary particle diameter of 300 nm or less whose examples include diantimony pentoxide sols, hexaantimony tridecaoxide sols, hydrated diantimony tetraoxide sols, colloidal diantimony trioxide and the like. The diantimony pentoxide sols can be produced by known methods, for example, a method in which diantimony trioxide is oxidized (Japanese Patent Publication No. 11848/1982), a method in which an alkali antimonate is dealkalized with ion exchange resins (U.S. Pat. No. 4,110,247), a method in which sodium antimonate is treated with an acid (Japanese Patent Application Laid-open Nos. 41536/1985 and 182116/1987) and the like. The hexaantimony tridecaoxide sols can be produced by a method in which diantimony trioxide is oxidized (Japanese Patent Application Laid-open No. 125849/1987) and the hydrated diantimony tetraoxide sols can be produced by a method in which diantimony trioxide is oxidized (Japanese Patent Application Laid-open No. 21298/1977). The colloidal diantimony trioxide can be produced by a gas phase method (Japanese Patent Publication No. 3292/1986). As the above-described antimony oxide sols, particularly preferred are acidic sols having a primary particle diameter of 2 to 200 nm, preferably 2 to 40 nm, and not containing a base such as an amine or sodium. As the antimony oxide sol, there may be used those whose antimony oxide ($Sb_2O_5$, $Sb_6O_{13}$, or $Sb_2O_4$) concentration is 1 to 60% by weight. They can be used as a dry product of antimony oxide sol dried by spray-drying, vacuum drying, freeze drying, or the like. The colloidal antimony oxide sol may be those commercially available as industrial chemicals in the form of diantimony pentoxide sol, diantimony pentoxide powder, or ultrafine particulate diantimony trioxide powder.

The mixing of the above-described zinc compound with the antimony oxide sols can be performed by using a SATAKE type stirrer, a Fhaudler type stirrer, a disper or the like at a mixing temperature of 0 to 100° C. for a mixing time of 0.1 to 30 hours. The mixing of the above-described zinc compound with the dry products of antimony oxide sols or colloidal diantimony trioxide can be performed by using a mortar, a V type mixer, a Henschel mixer, a ball mill, or the like apparatus.

It is preferred that the above-described zinc compound and the antimony oxide sols or their dry products or colloidal diantimony trioxide be mixed in a $ZnO/Sb_2O_5$ molar ratio of 0.8 to 1.2. The drying of the above-described mixture slurry of the zinc compound and antimony oxide sol may be performed by using a spray drier, a drum drier, a box type hot air drier, a vacuum drier, a freeze drier or the like at temperatures of 500° C. or lower. The resulting slurries may be separated by suction filtration, centrifugal filtration, filter pressing or the like and optionally removing soluble impurities ($SO_4$ or the like which hardly volatilizes by calcination) originating from the starting materials by washing with poured water to form a wet cake, which is then dried the wet cake at room temperature to 500° C. in a box type hot air drier, for example. The drying is performed preferably at temperatures of 300° C. or lower taking into consideration the apparatus and operation used.

The calcination of the dry product of the mixture of the zinc compound with the antimony oxide sol or the mixture of the zinc compound with the dry product of antimony oxide sol or colloidal antimony trioxide is performed at 500 to 1,100° C., preferably 550 to 900° C. for 0.5 to 50 hours, preferably 2 to 20 hours. The calcination gives rise to anhydrous zinc antimonate by a solid phase reaction. The color of the anhydrous zinc antimonate thus obtained varies in its color from white to bluish green depending on the conditions of calcination.

Upon X-ray diffraction measurement, the anhydrous zinc antimony obtained in the above-described method showed X-ray diffraction peaks identical with those of the zinc antimonates described in ASTM (Index to the X-ray Powder Data File Inorganic), i.e., ASTM No. 3-0455 for $ZnSb_2O_6$ and No. 11-214 for $Zn(SbO_3)_2$, with showing no diffraction peaks of zinc oxide and anhydrous antimony pentoxide, so that it was judged to have a $ZnSb_2O_6$ structure. However, it revealed that when the calcination temperature is 500 to 680° C., the X-ray diffraction peaks are located on the side of low diffraction angles, thus the anhydrous zinc antimonate has an open structure. The X-ray diffraction peaks in case where the calcination temperature is 680° C. or higher coincided with those described in ASTM inclusive of diffraction angles. As a result of differential thermal analysis (DTA-TG), the above-described zinc antimonate showed no loss of weight at room temperature to 1,000° C., which indicated that the compound was confirmed to be anhydrous zinc antimonate having no crystal water.

Transmission electron microscopic analysis of the above-described zinc antimonate confirmed that it had a primary particle diameter of 5 to 500 nm and was of fine particle on the level of colloids. In particular, the zinc antimonate obtained at a calcination temperature of 500 to 680° C. exhibited a resistivity of 0.1 k Ω to 1M Ω and has conductivity due to conduction of electrons.

An aqueous sol of anhydrous zinc antimonate can readily be obtained by wet grinding of anhydrous zinc antimonate performed in water using a sand grinder, a ball mill, a homogenizer, a disper, a colloid mill or the like. Further, anhydrous zinc antimonate will not convert into hydrated salts if ground or heated in water but remains anhydrous.

The aqueous sol after the above-described wet grinding will produce a sol having a high transparency by a deionization treatment. The deionization treatment is achieved with anion exchange and/or cation exchange. The aqueous sol after the wet pulverization is passed through an anion exchange resin and/or a cation exchange resin in order to perform a deionization treatment. The sol obtained by deionizing the aqueous sol after the wet grinding can be used in the present invention.

In case where anhydrous zinc antimonate is wet ground to obtain an anhydrous zinc antimonate aqueous sol, the aqueous sol can be stabilized by addition of alkylamines such as ethylamine, propylamine, isopropylamine, and diisobutylamine, alkanolamines such as triethanolamine and monoethanolamine, diamines such as ethylenediamine, and/ or hydroxycarboxylic acids such as lactic acid, tartaric acid, malic acid, and citric acid. These amines and/or hydroxycarboxylic acids-stabilized anhydrous zinc antimonate aqueous sols can be used in the present invention.

According to the present invention, mixing an anhydrous zinc antimonate aqueous sol and a silicon-containing substance and stirring the mixture gives rise to a sol which comprises a liquid having dispersed therein surface-modified anhydrous zinc antimonate colloid particles which comprise anhydrous zinc antimonate colloid particles as nuclei and a silicon-containing substance coating surfaces of the nuclei.

In the sol of the present invention, it is preferred that the anhydrous zinc antimonate ($ZnO \cdot Sb_2O_5$) be coated with the silicon-containing substance in a proportion of 0.1 to 5% by weight in terms of $SiO_2$ based on the weight of the anhydrous zinc antimonate.

The silicon-containing substance used in the present invention includes at least one silicon-containing substance selected from the group consisting of compounds represented by general formula (I):

$$(R^1)_a(R^3)_b Si(OR^2)_{4-(a+b)} \qquad (I)$$

(wherein $R^1$ and $R^3$ independently represent an alkyl group, an aryl group, a halogenated alkyl group, a halogenated aryl group, an alkenyl group, or an organic group having an epoxy, acryloyl, methacryloyl, mercapto, amino or cyano group, the organic group being bonded to the silicon atom through a Si—C bond, $R^2$ contains 1 to 8 carbon atoms and represents an alkyl group, an alkoxyalkyl group or an acyl group, a and b are each 0, or an integer of 1 or 2, provided that a+b is 0, or an integer of 1 or 2) and general formula (II):

$$[(R^4)_c Si(OX)_{3-c}]_2 Y \qquad (II)$$

(wherein $R^4$ represents an alkyl group having 1 to 5 carbon atoms, X represents an alkyl or acyl group having 1 to 4 carbon atoms, Y is a methylene group, an alkylene group having 2 to 20 carbon atoms, or an imino group, c is 0 or an integer of 1, 2, or 3) and their hydrolysates.

The formula:

$$(R^1)_a(R^3)_b Si(OR^2)_{4-(a+b)} \qquad (I),$$

embraces organic silicon compounds in which $R^1$ and $R^3$ represent the same organic group or different organic groups, in which a and b are the same number or different numbers. The organic silicon compound represented by general formula (I) above includes, for example, tetramethoxysilane, tetraethoxysilane, tetra-n-propoxysilane, tetraisopropoxysilane, tetra-n-butoxysilane, tetraacetoxysilane, methyltrimethoxysilane, methyltriethoxysilane, methyltripropoxysilane, methyltriacetoxysilane, methyltributoxysilane, methyltripropoxysilane, methyltriamyloxysilane, methyltriphenoxysilane, methyltribenzyloxysilane, methyltriphenethyloxysilane, glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, α-glycidoxybutyltrimethoxysilane, α-glycidoxybutyltriethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, (3,4-epoxycyclohexyl) methyltrimethoxysilane, (3,4-epoxycyclohexyl) methyltriethoxysilane, β-(3,4-epoxycyclohexyl) ethyltrimethoxysilane, β-(3,4-epoxycyclohexyl) ethyltriethoxysilane, β-(3,4-epoxycyclohexyl) ethyltripropoxysilane, β-(3,4-epoxycyclohexyl) ethyltributoxysilane, β-(3,4-epoxycyclohexyl) ethyltriphenoxysilane, γ-(3,4-epoxycyclohexyl) propyltrimethoxysilane, γ-(3,4-epoxycyclohexyl) propyltriethoxysilane, δ-(3,4-epoxycyclohexyl) butyltrimethoxysilane, δ-(3,4-epoxycyclohexyl) butyltriethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylethyldimethoxysilane, α-glycidoxypropylmethyldimethoxysilane, α-glycidoxypropylmethyldiethoxysilane, β-glycidoxypropylmethyldimethoxysilane, β-glycidoxypropylethyldimethoxysilane, γ-glycidoxypropylmethyldimethoxysilane, γ-glycidoxypropylm ethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropylethyldimethoxysilane, γ-glycidoxypropylethyldiethoxysilane, γ-glycidoxypropylvinyldimethoxysilane, γ-glycidoxypropylvinyldiethoxysilane, ethyltrimethoxysilane, ethyltriethoxysilane, vinyltrimethoxysilane, vinyltriethoxysilane, vinyltriacetoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-methacryloxypropyltrimethoxysilane, γ-mercaptopropyltrimethoxysilane, γ-mercaptopropyltriethoxysilane,
β-cyanoethyltriethoxysilane, chloromethyltrimethoxysilane, chloromethyltriethoxysilane, N-(β-aminoethyl)γ-aminopropyltrimethoxysilane, N-(β-aminoethyl)γ-aminopropylmethyldimethoxysilane, γ-aminopropylmethyldimethoxysilane, N-(β-aminoethyl)γ-aminopropyltriethoxysilane, N-(β-aminoethyl)γ-aminopropylmethyldiethoxysilane, dimethyldimethoxysilane, phenylmethyldimethoxysilane, dimethyldiethoxysilane, phenylmethyldiethoxysilane, γ-chloropropylmethyldimethoxysilane, γ-chloropropylmethyldiethoxysilane, dimethyldiacetoxysilane, γ-methacryloxypropylmethyldimethoxysilane, γ-methacryloxypropylmethyldiethoxysilane, γ-mercaptopropylmethyldimethoxysilane, γ-mercaptomethyldiethoxysilane, methylvinyldimethoxysilane, methylvinyldiethoxysilane, and the like. These may be used alone or two or more of them may be used in combination.

The hydrolysate of the silicon-containing substance represented by general formula (I) correspond to compounds of general formula (I) in which $R^2$ is partly or fully substituted by hydrogen atoms. The hydrolysates of the silicon-containing substance represented by general formula (I) may be used alone or two or more of them may be used in combination. Hydrolysis may be performed by adding water, to the silicon-containing substance, or if desired, an acidic aqueous solution such as an aqueous hydrochloric acid solution, an aqueous sulfuric acid solution, or an aqueous acetic acid solution, followed by stirring. In the present invention, $R^2$ in general formula (I) is partly or fully substituted by hydrogen atoms by the method in which the silicon-containing substance represented by general formula (I) is mixed with the anhydrous zinc antimonate aqueous sol, starting material, or the e method in which the silicon-containing substance is mixed with the anhydrous zinc antimonate methanol sol and water, so that the silicon-containing substance or it s hydrolysate can be coated on the surfaces of the anhydrous zinc antimonate particles.

The compound represented by general formula (II):

includes, for example, methylenebismethyldimethoxysilane, ethylenebisethyldimethoxysilane, propylenebisethyldiethoxysilane, butylenebismethyldiethoxysilane, hexamethyldisilazane, and the like. These may be used alone or two or more of them may be used in combination.

The hydrolysates of the silicon-containing substance represented by general formula (II) correspond to those compounds of general formula (II) in which X is partly or fully substituted by hydrogen atoms. The hydrolysates of the silicon-containing substance represented by general formula (II) may be used alone or two or more of them may be used in combination. Hydrolysis may be performed by adding water, to the silicon-containing substance, or if desired, an acidic aqueous solution such as an aqueous hydrochloric acid solution, an aqueous sulfuric acid solution, or an aqueous acetic acid solution, followed by stirring. In the present invention, X in general formula (II) is partly or fully substituted by hydrogen atoms by the method in which the silicon-containing substance represented by general formula (II) is mixed with the anhydrous zinc antimonate aqueous sol, starting material, or the method in which the silicon-containing substance is mixed with the anhydrous zinc antimonate methanol sol and water, so that the silicon-containing substance or its hydrolysate can be coated on the surfaces of the anhydrous zinc antimonate particles.

In the present invention, it is preferred to use at least one silicon-containing substance selected from the group consisting of the compound represented by general formula (I) and hydrolysates thereof. In particular, methyltrimethoxysilane, methyltriethoxysilane, methyltributoxysilane, and their hydrolysates are preferred.

The sol of the present invention preferably contains an organic solvent as the dispersant liquid. As the organic solvent, there can be used hydrocarbons and alcohols. The hydrocarbons may include aromatic hydrocarbons such as toluene and xylene and the alcohols may be solvents based on alcohols having 1 to 10 carbons such as isopropyl alcohol and butyl alcohol. In particular, isopropyl alcohol is preferred as the liquid serving as a dispersion medium. In case where methanol is used as a dispersion medium, it is preferred that the solvent be exchanged to such a dispersion medium as isopropyl alcohol before the sol can be used.

In a first method for producing the organosol of the present invention, a silicon-containing substance or its hydrolysate is coated on surfaces of anhydrous zinc antimonate particles by mixing an aqueous sol of anhydrous zinc antimonate with a silicon-containing substance followed by stirring in the step (a). The mixing and stirring is carried out at a liquid temperature of 5 to 80° C., preferably 20 to 40° C. for 1 to 8 hours. For the stirring, it is preferred to use a stirrer such as a disper or the like. In the step (b), the aqueous solvent in the aqueous sol obtained in the step (a) is substituted by an organic solvent. The organic solvent is, for example, toluene or xylene or isopropyl alcohol or butyl alcohol. Substitution by such organic solvents can give rise to an organosol having a high transparency. The solvent substitution may be carried out at atmospheric pressure or under reduced pressure by an evaporation method using an evaporator or the like. In case where the aqueous sol, starting material, contains no amine nor hydroxycarboxylic acid, it is preferred to stabilize the sol by addition of alkylamines such as ethylamine, propylamine, isopropylamine, and diisobutylamine, alkanolamines such as triethanolamine and monoethanolamine, diamines such as ethylenediamine, and/or hydroxycarboxylic acids such as lactic acid, tartaric acid, malic acid and citric acid at the stage of the solvent substitution in the step (b). Use of the amines and hydroxycarboxylic acids may include use of amines alone, use of hydroxycarboxylic acids alone, use of amines and hydroxycarboxylic acids in combination. When the aqueous sol is converted into organosols utilizing these solvents, conversion of an aqueous sol to an organosol through a methanol sol further increases the transparency of the organosol obtained since the surface-coated anhydrous zinc antimonate colloid particles do not agglomerate and they are dispersed in the dispersion medium in a state close to primary particle.

In a second method for producing the organosol of the present invention, there are used in the step (a') anhydrous zinc antimonate methanol sol is used as a starting material and a silicon-containing substance or its hydrolysate is coated on surfaces of anhydrous zinc antimonate particles by mixing a methanol sol of anhydrous zinc antimonate, a silicon-containing substance, and water, followed by stirring. The amount of water to be added is preferably an amount required for partly or fully hydrolyzing the silicon-containing substance. It is preferred that water be added in a proportion of 1 to 10 moles per mole of the alkoxide group.

The step (b') is a step in which a methanol solvent in the methanol sol obtained in the step (a') is substituted by a hydrocarbon solvent or an alcohol solvent having 2 to 10 carbon atoms. As the hydrocarbon is used, for example, toluene or xylene. The alcohol solvent having 2 to 10 carbon atoms may be isopropyl alcohol or butyl alcohol. Substitution by such organic solvents can give rise to an organosol having a high transparency. The solvent substitution may be carried out at atmospheric pressure or under reduced pressure by an evaporation method using an evaporator or the like. In case where the aqueous sol, starting material, contains no amine nor hydroxycarboxylic acid, it is preferred to stabilize the sol by addition of alkylamines such as ethylamine, propylamine, isopropylamine, and diisobutylamine, alkanolamines such as triethanolamine and monoethanolamine, diamines such as ethylenediamine, and/or hydroxycarboxylic acids such as lactic acid, tartaric acid, malic acid and citric acid at the stage of the solvent substitution in the step (b'). Use of the amines and hydroxycarboxylic acids may include use of amines alone, use of hydroxycarboxylic acids alone, use of amines and hydroxycarboxylic acids in combination.

In the sol of the present invention, it is preferred that the silicon-containing substance be coated in a ratio of 0.1 to 5% by weight of the substance in terms of $SiO_2$ to said anhydrous zinc antimonate ($ZnO.Sb_2O_5$). With below 0.1% by weight, the surface of the anhydrous zinc antimonate particles can not be coated uniformly with the silicon-containing substance or its hydrolysate whereas when the amount of the silicon-containing substance exceeds 5% by weight in terms of $SiO_2$, the silicon-containing substance or its hydrolysate will be coated in that may fold on the surface of the anhydrous zinc antimonate particles, so that the silicon-containing substance or its hydrolysate could form an insulating layer when the resulting sol is used as an antistatic agent, thus reducing conductivity and reducing its antistatic properties, which is undesirable.

The surface-modified anhydrous zinc antimonate colloid particles obtained by coating the surfaces of anhydrous zinc antomonate colloid particles as nuclei with a silicon-containing substance produced according to the present invention, have a $ZnO/Sb_2O_5$ molar ratio of 0.8 to 1.2 and a primary particle diameter of 5 to 500 nm, preferably 5 to 50 nm by electoron microscope observation. The dry products of the above surface-modified anhydrous zinc antimonate sol exhibits a volume resistivity of $0.1K\Omega\cdot cm$ to $1M\Omega\cdot cm$.

The sol which contains surface-modified anhydrous zinc antimonate colloid particles obtained by coating the surfaces of anhydrous zinc antimonate colloid particles as nuclei with a silicon-containing substance, dispersed in a high boiling alcohol based solvent, such as isopropyl alcohol, produced according to the present invention can be used by itself in various applications such as a transparent antistatic material, a transparent ultraviolet absorbent, a transparent thermal ray absorbent, high refractive index hard coating agent, antireflective agent, and the like, for resins, plastics, glasses, paper, magnetic tapes, etc. Further, mixing with a silane coupling agnet with an isopropyl alcohol sol of the above-described surface-modified anhydrous zinc antimonate colloid particles produced by coating the surface of anhydrous zinc antimonate colloid particles as nuclei with a silicon-containing substance results in a coating composition for providing optical components such as lenses for eye glasses, lenses for cameras, window glasses for automobiles, optical filters attached to liquid crystal displays or plasma displays with a coating film having excellent mar resistance, surface hardness, transparency, heat resistance, light fastness, weather ability, and water resistance. As the silane coupling agent used in this coating composition may be used the silicon-containing substances represented by general formulae (I) and (II).

EXAMPLES

Example 1

1,300 g of diantimony trioxide (manufactured by Mikuni Seiren Co., Ltd.) was dispersed in 5,587 g of water. To the dispersion was added 953.7 g of 35% hydrogen peroxide and the mixture was heated to 90 to 100° C. and for 2 hours for reaction to obtain a diantimony pentoxide sol. The resulting sol had a specific gravity of 1.198, a pH of 1.80, a viscosity of 19.5 mPa·s, a $Sb_2O_5$ concentration of 18.4% by weight, a primary particle diameter of 20 to 30 nm by transmission electron microscopic observation, and a BET specific surface area of 55.0 $m^2/g$. To the diantimony pentoxide sol was added 276 g of basic zinc carbonate (manufactured by Sakai Kagaku Co., Ltd., 3 $ZnCO_3 \cdot 4Zn(OH)_2$ containing 70% by weight as ZnO), followed by mixing and stirring for 5 hours to obtain a slurry. The slurry was dried using a spray drier to obtain pale yellow powder. The powder was calcined in a gas oven at 575° C. for 10 hours to obtain bluish green powder. As a result of X-ray analysis, the powder was found to have the same peaks as those of anhydrous zinc antimonate ($ZnSb_2O_6$). Also, the powder was press molded at 100 $kg/cm^2$, and the molded article showed a conductivity in terms of resistivity of 80 $\Omega\cdot cm$. After the powder was ground in a pin-disk mill, 700 g of the powder and 1,400 g of water were charged in a 5-liter attritor with glass beads (diameter: 1.5 to 2.0 mm) for grinding and while the glass beads were being pushed by water, an aqueous sol was obtained. The resulting aqueous sol was concentrated to 2,920 g in a rotary evaporator. The anhydrous zinc antimonate aqueous sol thus obtained was transparent bluish green and had a specific gravity of 1.273, a pH of 6.2, a viscosity of 2.0 mPa·s, a conductivity of 145 $\mu s/cm$, and a $ZnSb_2O_6$ concentration of 26.0% by weight. This sol had a primary particle diameter of 15 to 50 nm by transmission electron microscopic observation and aggregated particle size of 128 nm by laser scattering particle size distribution analyzer, 110 nm by centrifugal sedimentation particle size distribution. And dry product of the sol had a BET specific surface area of 46.1 $m^2/g$. The particle diameter calculated from the specific surface area was 21 nm.

To 4,900 g of the anhydrous zinc antimonate aqueous sol was added 28 g of methyltrimethoxysilane (manufactured by Toray Dow Corning Silicone Co., Ltd., trade name SZ6070) and the mixture was stirred at room temperature for 5 hours with a disper. To this were added 3.13 g of diisopropylamine and 5.0 g of malic acid, followed by mixing with stirring at room temperature for 2 hours with a disper. Thus, there was obtained a colloid solution of anhydrous zinc antimonate having the surface of whose particles is coated with methyltrimethoxysilane or its hydrolysate. The colloid solution had a pH of 3.9. The aqueous solvent of the surface-modified anhydrous zinc antimonate colloid solution was substituted by a methanol solvent and then by an isopropyl alcohol solvent using a rotary evaporator to produce surface-modified anhydrous zinc antimonate isopropyl alcohol sol. The resulting isopropyl alcohol sol contained 21.4% of $ZnO.Sb_2O_5$ and the amount of silane coupling agent coated was 1.0% by weight in terms of $SiO_2$ based on the weight of $ZnO.Sb_2O_5$. The solution obtained by mixing this sol with water in a weight ratio of 1:1 had a pH of 4.9, and a primary particle diameter of 15 to 50 nm by transmission electron microscopic observation and aggregated paticle size of 250 nm by laser scattering particle size distribution analyzer. A dry product of the sol had a volume resistivity of 2,500 Ω·cm.

Example 2

To 1,600 g of the anhydrous zinc antimonate aqueous sol used in Example 1 was add ed 5.0 g of methyltrimethoxysilane (manufactured by Toray Dow Corning Silicone Co., Ltd., trade name SZ6070) and the mixture was stirred at room temperature for 1.5 hours with a disper. To this were added 0.71 g of diusopropylamine and 1.0 g of malic acid, followed by mixing with stirring at room temperature for 4 hours with a disper to obtain a colloid solution of anhydrous zinc antimonate having the surface of whose particles is coated with methyltrimethoxysilane or its hydrolysate. The colloid solution had a pH of 4.1. The aqueous solvent of the surface-modified anhydrous zinc antimonate colloid solution was substituted by a methanol solvent and then by an isopropyl alcohol solvent using a rotary evaporator to produce surface-modified anhydrous zinc antimonate isopropyl alcohol sol. The resulting isopropyl alcohol sol contained 27.5% of $ZnO.Sb_2O_5$ and the amount of Silane coupling agent coated was 0.5% by weight in terms of $SiO_2$ based on the weight of $ZnO.Sb_2O_5$. The solution obtained by mixing this sol with water in a weight ratio of 1:1 had a pH of 5.1, and a primary particle diameter of 15 to 50 nm by transmission electron microscopic observation and aggregated particle size of 170 nm by laser scattering particle size distribution analyzer. A dry product of the sol had a volume resistivity of 1,500 Ω·cm.

Example 3

To 860 g of the anhydrous zinc antimonate aqueous sol used in Example 1 was added 3.5 g of methyltrimethoxysilane (manufactured by Toray Dow Corning Silicone Co., Ltd., trade name SZ6070) and the mixture was stirred at room temperature for 4 hours with a disper. To this were added 0.43 g of diisopropylamine and 1.0 g of malic acid, followed by mixing with stirring at room temperature for 3 hours with a disper to obtain a colloid solution of anhydrous zinc antimonate having the surface of whose particles is coated with methyltrimethoxysilane or its hydrolysate. The colloid solution had a pH of 3.3. The aqueous solvent of the surface-modified anhydrous zinc antimonate colloid solution was substituted by a methanol solvent and then by an isopropyl alcohol solvent using a rotary evaporator to produce surface-modified anhydrous zinc antimonate isopropyl alcohol sol. The resulting isopropyl alcohol sol contained 22.0% of $ZnO.Sb_2O_5$ and the amount of silane coupling agent coated was 0.7% by weight in terms of $SiO_2$ based on the weight of $ZnO.Sb_2O_5$. The solution obtained by mixing this sol with water in a weight ratio of 1:1 had a pH of 4.0, and a primary particle diameter of 15 to 50 nm by transmission electron microscopic observation and aggregated particle size of 220 nm by laser scattering particle size distribution analyzer. A dry product of the sol had a volume resistivity of 1,800 Ω·cm.

Example 4

To 800 g of the anhydrous zinc antimonate aqueous sol used in Example 1 was added 4.0 g of methyltrimethoxysilane (manufactured by Toray Dow Corning Silicone Co., Ltd., trade name SZ6070) and the mixture was stirred at room temperature for 5 hours with a disper. To this were added 0.54 g of diisopropylamine and 1.1 g of mandelic acid, followed by mixing with stirring at room temperature for 3 hours with a disper to obtain a colloid solution of anhydrous zinc antimonate having the surface of whose particles is coated with methyltrimethoxysilane or its hydrolysate. The colloid solution had a pH of 3.5. The aqueous solvent of the surface-modified anhydrous zinc antimonate colloid solution was substituted by a methanol solvent and then by an isopropyl alcohol solvent using a rotary evaporator to produce surface-modified anhydrous zinc antimonate isopropyl alcohol sol. The resulting isopropyl alcohol sol contained 21.0% of $ZnO.Sb_2O_5$ and the amount of silane coupling agent coated was 0.9% by weight in terms of $SiO_2$ based on the weight of $ZnO.Sb_2O_5$. The solution obtained by mixing this sol with water in a weight ratio of 1:1 had a pH of 4.8, and a primary particle diameter of 15 to 50 nm by transmission electron microscopic observation and aggregated particle size of 217 nm by laser scattering particle size distribution analyzer. A dry product of the sol had a volume resistivity of 2,000 Ω·cm.

Example 5

To 1,600 g of the anhydrous zinc antimonate aqueous sol used in Example 1 was added 8.0 g of methyltrimethoxysilane (manufactured by Toray Dow Corning Silicone Co., Ltd., trade name SZ6070) and the mixture was stirred at room temperature for 2 hours with a disper. To this were added 1.45 g of diisobutylamine and 2.0 g of malic acid, followed by mixing with stirring at room temperature for 3 hours with a disper to obtain a colloid solution of anhydrous zinc antimonate having the surface of whose particles is coated with methyltrimethoxysilane or its hydrolysate. The colloid solution had a pH of 4.1. The aqueous solvent of the surface-modified anhydrous zinc antimonate colloid solution was substituted by a methanol solvent and then by an isopropyl alcohol solvent using a rotary evaporator to produce surface-modified anhydrous zinc antimonate isopropyl alcohol sol. The resulting isopropyl alcohol sol contain ed 23.0% of $ZnO.Sb_2O_5$ and the amount of silane coupling agent coated was 0.9% by weight in terms of $SiO_2$ based on the weight of $ZnO.Sb_2O_5$. The solution obtained by mixing this sol with water in a weight ratio of 1:1 had a pH of 4.8, and a primary particle diameter of 15 to 50 nm by transmission electron microscopic observation and aggregated particle size of 224 nm by laser scattering particle size distribution analyzer. A dry product of the sol h ad a volume resistivity of 2,000 Ω·cm.

Example 6

To 1,600 g of the anhydrous zinc antimonate aqueous sol used in Example 1 was added 8.0 g of methyltrimethoxysilane (manufactured by Toray Dow Corning Silicone Co., Ltd., trade name SZ6070) and the mixture was stirred at room temperature for 2 hours with a disper. To this were added 1.45 g of di-n-propylamine and 2.0 g of malic acid, followed by mixing with stirring at room temperature for 3 hours with a disper to obtain a colloid solution of anhydrous zinc antimonate having the surface of whose particles is coated with methyltrimethoxysilane or its hydrolysate. The colloid solution had a pH of 4.1. The aqueous solvent of the surface-modified anhydrous zinc antimonate colloid solution was substituted by a methanol solvent and then by an isopropyl alcohol solvent using a rotary evaporator to produce surface-modified anhydrous zinc antimonate isopropyl alcohol sol. The resulting isopropyl alcohol sol contained 21.6% of $ZnO.Sb_2O_5$ and the amount of silane coupling agent coated was 0.9% by weight in terms of $SiO_2$ based on the weight of $ZnO.Sb_2O_5$. The solution obtained by mixing this sol with water in a weight ratio of 1:1 had a pH of 5.2, and a primary particle diameter of 15 to 50 nm by transmission electron microscopic observation and aggregated particle size of 262 nm by laser scattering particle size distribution analyzer. A dry product of the sol had a volume resistivity of 2,000 Ω·cm.

Example 7

To 963 g of the anhydrous zinc antimonate aqueous sol used in Example 1 was added 5.5 g of methyltrimethoxysilane (manufactured by Toray Dow Corning Silicone Co., Ltd., trade name SZ6070) and the mixture was stirred at room temperature for 5 hours with a disper. To this were added 0.2 g of diisopropylamine, followed by mixing with stirring at room temperature for 2 hours with a disper to obtain a colloid solution of anhydrous zinc antimonate having the surface of whose particles is coated with methyltrimethoxysilane or its hydrolysate. The colloid solution had a pH of 5.5. The aqueous solvent of the surface-modified anhydrous zinc antimonate colloid solution was substituted by a methanol solvent and then by an isopropyl alcohol solvent using a rotary evaporator to produce surface-modified anhydrous zinc antimonate isopropyl alcohol sol. The resulting isopropyl alcohol sol contained 30.16% of $ZnO.Sb_2O_5$ and the amount of silane coupling agent coated was 1.0% by weight in terms of $SiO_2$ based on the weight of $ZnO.Sb_2O_5$. The solution obtained by mixing this sol with water in a weight ratio of 1:1 had a pH of 5.4, and a primary particle diameter of 15 to 50 nm by transmission electron microscopic observation and aggregated particle size of 170 nm by laser scattering particle size distribution analyzer. A dry product of the sol had a volume resistivity of 1,122 Ω·cm.

Example 8

110 kg of diantimony trioxide (manufactured by Mikuni Seiren Co., Ltd.) and 3.3 kg of basic zinc carbonate (manufactured by Sakai Kagaku Co., Ltd., $3ZnCO_3·4Zn(OH)_2$ containing 70% by weight as ZnO), were dispersed in 1,364 kg of water. To this were added 182 kg of 35% hydrogen peroxide and 594 g of 87% formic acid, and the mixture was heated to 90 to 100° C. for 2 hours for reaction to obtain diantimony pentoxide sol. The resulting sol had a specific gravity of 1.174, a pH of 1.44, a viscosity of 1.8 mPa·s, a $Sb_2O_5$ concentration of 16.3% by weight, a primary particle diameter of 20 to 30 nm by transmission electron microscopic observation, and a BET specific surface area of 41.3 m²/g. After 334 kg of the resulting diantimony pentoxide sol was diluted with deionized water to a $Sb_2O_5$ concentration of 13.3% by weight, 16.9 kg of basic zinc carbonate (manufactured by Sakai Kagaku Co., Ltd., $3ZnCO_3·4Zn(OH)_2$ containing 70% by weight as ZnO) was added thereto and the mixture was stirred for 6 hours to obtain a slurry. The slurry contained 3.1% by weight of the anhydrous zinc antimonate in terms of ZnO and 12.7% by weight of the anhydrous zinc antimonate in terms of $Sb_2O_5$, with a $ZnO/Sb_2O_5$ molar ratio being 0.97. The slurry was dried using a spray drier to obtain dry powder. X-ray diffraction analysis of the dry powder revealed that the powder had the same peaks as those of hydrated diantimony pentoxide ($Sb_2 O_5/xH_2O$).

The dry powder was calcined in a gas oven at 575° C. for 10 hours to obtain bluish green powder. As a result of X-ray analysis, the powder was found to have the same peaks as those of anhydrous zinc antimonate ($ZnSb_2O_6$). Also, the powder was press molded at 300 kg/cm², and the molded article showed a conductivity in terms of resistivity of 80 Ω·cm. After the powder was ground in a pin-disk mill, 700 g of the powder and 1,400 g of water were charged in a 5-liter attritor with glass beads (diameter: 1.0 to 1.5 mm) for attrition and while the glass beads were being pushed by water, an aqueous sol was obtained. The resulting aqueous sol had a pH of 6.3. The aqueous sol was passed through a column filled with 750 ml of an anion exchange resin at a flow rate of SV=12 to perform anion exchange. Then, the sol was further passed through a column filled with 750 ml of a cation exchange resin at a flow rate of SV=12 to effect cation exchange. After the ion exchange, the sol had a pH of 3.9. To this sol was added 10% KOH aqueous solution to adjust pH 11.5 and the sol was heated at 90 to 100° C. for 5 hours for maturation. After the maturation, the sol had a pH of 10.0. The resulting aqueous sol was passed through a column filled with 750 ml of an anion exchange resin at a flow rate of SV=12 to perform anion exchange. Then, the sol was further passed through a column filled with 750 ml of a cation exchange resin at a flow rate of SV=12 to effect cation exchange. The sol after the ion exchange had a pH of 3.3. The aqueous sol thus treated was concentrated to 3,100 g in a rotary evaporator. The anhydrous zinc antimonate aqueous sol thus obtained was transparent bluish green and had a specific gravity of 1.221, a pH of 3.22, a viscosity of 3.0 mPa·s, a conductivity of 217.5 μs/cm, and a $ZnSb_2O_6$ concentration of 21.6% by weight. This sol had a primary particle diameter of 15 to 50 nm by transmission electron microscopic observation, 132 nm by laser scattering particle size distribution analyzer or 100 nm by a centrifugal sedimentation particle size distribution analyzer, and dry product of the sol had a BET specific surface area of 46.1 m²/g. The particle diameter calculated from the specific surface area was 21 nm.

To 769 g of the anhydrous zinc antimonate aqueous sol was added 2.81 g of methyltrimethoxysilane (manufactured by Toray Dow Corning Silicone Co., Ltd., trade name SZ6070) and the mixture was stirred at room temperature for 4 hours with a disper. To this were added 0.34 g of diisopropylamine and 0.80 g of malic acid, followed by mixing with stirring at room temperature for 2 hours with a disper. Thus, there was obtained a colloid solution of anhydrous zinc antimonate having the surface of whose particles was coated with methyltrimethoxysilane or its hydrolysate. The colloid solution had a pH of 3.4. The aqueous solvent of the surface-modified anhydrous zinc antimonate colloid solution was substituted by a methanol solvent and then by an isopropyl alcohol solvent using a rotary evaporator to produce surface-modified anhydrous zinc antimonate isopropyl alcohol sol. The resulting isopropyl alcohol sol contained 20.5% of $ZnO.Sb_2O_5$ and the amount of silane coupling agent coated was 0.7% by weight in terms of $SiO_2$ based on the weight of $ZnO.Sb_2O_5$. The solution obtained by mixing this sol with water in a weight ratio of 1:1 had a pH of 4.3, and a primary particle diameter of 15 to 50 nm by transmission electron microscopic observation and aggregated particle size of 200 nm by laser scattering particle size distribution analyzer. A dry product of the sol had a volume resistivity of 1,762 Ω·cm.

Comparative Example 1

To 1,600 g of the anhydrous zinc antimonate aqueous sol used in Example 1 was added 3.13 g of diisopropylamine and 2.0 g of malic acid and the mixture was stirred at room temperature for 3 hours with a disper. The resulting colloid solution had a pH of 4.1. The aqueous medium of the colloid solution was substituted by a methanol solvent and then by an isopropyl alcohol solvent using a rotary evaporator to produce anhydrous zinc antimonate isopropyl alcohol sol. As a result, the anhydrous zinc antimonate particles agglomerated, thus failing to give stable isopropyl alcohol sol.

What is claimed:

1. An anhydrous zinc antimonate sol comprising surface-modified anhydrous zinc antimonate colloid particles dispersed in a liquid, said surface-modified anhydrous zinc antimonate colloid particles comprising anhydrous zinc antimonate colloid particles as nuclei and a silicon-containing substance coating surfaces of the colloid particles, said sol containing an amine, an hydroxycarboxylic acid or a mixture thereof, wherein said silicon-containing substance is at least one silicon-containing substance selected from the group consisting of a compound represented by general formula (I) below:

$$(R^1)_a(R^3)_bSi(OR^2)_{4-(a+b)} \qquad (I)$$

wherein $R^2$ and $R^3$ independently represent an alkyl group, an aryl group, a halogenated alkyl group, a halogenated aryl group, an alkenyl group, or an organic group having an epoxy, acryloyl, methacreyloyl, mercapto, amino or cyano group, and the organic group being bonded to the silicon atom through a Si—C bond, $R^2$ contains 1 to 8 carbon atoms and represents an alkyl group, an alkoxyalkyl group or an acyl group, a and b are each 0, or an integer of 1 or 2, provided that a+b is 0, or an integer of 1 or 2 and a compound represented by general formula (II) below:

$$((R^4)_cSi(OX)_{3-c})_2Y \qquad (II)$$

wherein $R^4$ represents an alkyl group having 1 to 5 carbon atoms, X represents an alkyl or acyl group having 1 or 4 carbon atoms, Y is a methylene group, an alkylene group having 2 to 20 carbon atoms, or an imino group, c is 0 or an integer of 1, 2 or 3 and their hydrolysates.

2. The sol as claimed in claim 1, wherein said silicon-containing substance is selected from the compound represented by general formula (I) and its hydrolysate.

3. The sol as claimed in claim 1, wherein said liquid as a dispersion medium is an organic solvent.

4. The sol as claimed in claim 1, wherein said silicon-containing substance is coated in a ratio of 0.1 to 5% by weight of the substance in terms of $SiO_2$ to said anhydrous zinc antimonate ($ZnO \cdot Sb_2O_5$).

5. A method for producing a surface-modified anhydrous zinc antimonate organosol that is comprised of a surface-modified anhydrous zinc antimonate colloid particles dispersed in a liquid, said surface-modified anhydrous zinc antimonate colloid particles comprising anhydrous zinc antimonate colloid particles as nuclei and a silicon-containing substance coating surfaces of the colloid particles, said sol containing an amine, an hydroxycarboxylic acid or a mixture thereof, said method comprising the steps of:

(a) mixing an aqueous sol of anhydrous zinc antimonate with a silicon-containing substance followed by stirring, and (b) substituting an aqueous solvent in the aqueous sol obtained in the step (a) by an organic solvent in the presence of an amine, an hydroxycarboxylic acid or a mixture thereof.

6. A method for producing a surface-modified anhydrous zinc antimonate organosol that is comprised of surface-modified anhydrous zinc antimonate colloid particles dispersed in a liquid, said surface-modified anhydrous zinc antimonate colloid particles comprising anhydrous zinc antimonate colloid particles as nuclei and a silicone-containing substance coating surfaces of the colloid particles, said sol containing an amine, an hydroxycarboxylic acid or a mixture thereof, said method comprising the steps of: (a') mixing a methanol sol of anhydrous zinc antimonate, a silicon-containing substance, and water, followed by stirring, and (b') substituting a methanol solvent in the methanol sol obtained in the step (a') by a hydrocarbon solvent or an alcohol solvent having 2 to 10 carbon atoms in the presence of an amine, an hydroxycarboxylic acid or a mixture thereof.

* * * * *